US005607737A

United States Patent [19]

Blackwell et al.

[11] Patent Number: 5,607,737

[45] Date of Patent: *Mar. 4, 1997

[54] SHEET STACK

[75] Inventors: Elmer Blackwell, Woodbury; John J. Emmel, Blaine, both of Minn.; Harry A. Loder, Austin, Tex.

[73] Assignee: Minnesota Mining and Manufacturing Company, St. Paul, Minn.

[ * ] Notice: The term of this patent shall not extend beyond the expiration date of Pat. No. 5,401,547.

[21] Appl. No.: 381,644

[22] Filed: Jan. 31, 1995

Related U.S. Application Data

[63] Continuation of Ser. No. 141,421, Oct. 20, 1993, Pat. No. 5,401,547, which is a continuation of Ser. No. 33,116, Mar. 18, 1993, abandoned, which is a continuation of Ser. No. 788,230, Nov. 5, 1991, abandoned, which is a division of Ser. No. 625,311, Dec. 10, 1990, Pat. No. 5,086,946.

[51] Int. Cl.[6] .................... B32B 7/06

[52] U.S. Cl. .................... 428/40.1; 206/220; 206/449; 206/484; 221/45; 221/61; 221/63; 428/194; 428/195; 428/201; 428/212; 428/220; 428/354

[58] Field of Search .................... 428/40, 194, 195, 428/201, 212, 220, 354, 40.1; 206/484, 449, 220; 221/45, 61, 63

[56] References Cited

U.S. PATENT DOCUMENTS

| | | | |
|---|---|---|---|
| H377 | 12/1987 | Greig | 281/2 |
| D. 116,599 | 9/1939 | Reinecke | D19/69 |
| 297,217 | 4/1884 | Abbott | 206/39.8 |
| 1,878,399 | 9/1932 | Hope | 221/59 |
| 2,170,147 | 8/1939 | Lane | 206/447 |
| 2,464,426 | 3/1949 | Williams | 221/58 |
| 2,528,602 | 11/1950 | Magit | 15/104.94 |
| 2,532,011 | 11/1950 | Dahlquist et al. | 428/40.1 |
| 2,574,152 | 11/1951 | Lewis et al. | 206/56 |
| 2,592,255 | 4/1952 | Drees | 221/58 |
| 2,607,711 | 8/1952 | Hendricks | 428/40.1 |
| 2,876,894 | 3/1959 | Dahlquist et al. | 206/59 |
| 2,926,105 | 2/1960 | Steinhauser et al. | 428/353 |
| 2,927,868 | 3/1960 | Revoir | 428/351 |
| 3,083,393 | 4/1963 | Nappi | 15/215 |
| 3,331,729 | 7/1967 | Danielson et al. | 428/40.4 |
| 3,373,457 | 3/1968 | Rouch, Jr. | 15/104.2 |
| 3,381,853 | 5/1968 | Ferris et al. | 221/63 |
| 3,463,515 | 8/1969 | Thompson | 283/37 |
| 3,578,622 | 5/1971 | Brown et al. | 524/464 |
| 3,583,358 | 6/1971 | Hanson, Jr. | 283/42 |
| 3,691,140 | 9/1972 | Silver | 526/240 |
| 3,785,102 | 1/1974 | Amos | 15/215 |
| 3,937,493 | 2/1976 | Fasbender | 283/41 |
| 4,107,811 | 8/1978 | Imsande | 15/215 |
| 4,279,717 | 7/1981 | Eckberg et al. | 204/159.13 |
| 4,313,988 | 2/1982 | Koshar et al. | 428/40 |
| 4,416,392 | 11/1983 | Smith | 221/45 |
| 4,421,904 | 12/1983 | Eckberg et al. | 528/27 |
| 4,558,888 | 12/1985 | Hanson et al. | 281/23 |
| 4,562,938 | 1/1986 | Loder | 221/46 |
| 4,586,629 | 5/1986 | Loder | 221/46 |
| 4,586,631 | 5/1986 | Loder | 221/58 |
| 4,609,208 | 9/1986 | Wrobel | 283/81 |

(List continued on next page.)

FOREIGN PATENT DOCUMENTS

| | | |
|---|---|---|
| 0159164 | 10/1985 | European Pat. Off. . |
| 1260215 | 3/1960 | France . |
| 178618 | 2/1905 | Germany . |
| 8516468 | 6/1985 | Germany . |
| 174274 | 6/1935 | Switzerland . |
| 345066 | 2/1930 | United Kingdom . |
| 2198369 | 6/1988 | United Kingdom . |
| 2214464 | 9/1989 | United Kingdom . |
| WO85/00781 | 2/1985 | WIPO . |
| WO87/07971 | 12/1987 | WIPO . |

*Primary Examiner*—Nasser Ahmad

*Attorney, Agent, or Firm*—Gary L. Griswold; Walter N. Kirn; Jeffrey J. Hohenshell

[57] ABSTRACT

A stack of pre-cut sheets and a dispenser for those sheets are disclosed. The sheets include different adhesion levels to afford individual dispensing of the sheets.

4 Claims, 6 Drawing Sheets

U.S. PATENT DOCUMENTS

| | | | |
|---|---|---|---|
| 4,624,893 | 11/1986 | Shibano et al. | 428/327 |
| 4,650,706 | 3/1987 | Emmel | 428/401 |
| 4,653,666 | 3/1987 | Mertens | 221/45 |
| 4,674,634 | 6/1987 | Wilson | 206/554 |
| 4,699,842 | 10/1987 | Jorgensen et al. | 428/343 |
| 4,713,274 | 12/1987 | Minor | 428/43 |
| 4,735,837 | 4/1988 | Miyasaka et al. | 428/40.1 |
| 4,742,913 | 5/1988 | Emmel et al. | 200/460 |
| 4,768,810 | 9/1988 | Mertens | 428/43 |
| 4,770,320 | 9/1988 | Miles et al. | 221/33 |
| 4,781,306 | 11/1988 | Smith | 221/33 |
| 4,835,217 | 5/1989 | Jorgensen et al. | 525/93 |
| 4,895,746 | 1/1990 | Mertens | 428/194 |
| 4,895,747 | 1/1990 | Birkholz et al. | 428/43 |
| 4,907,825 | 3/1990 | Miles et al. | 283/81 |
| 4,928,864 | 5/1990 | Walker et al. | 224/162 |
| 4,993,590 | 2/1991 | Windorski | 221/46 |
| 4,994,322 | 2/1991 | Deigado et al. | 428/343 |
| 5,061,535 | 10/1991 | Kreckel et al. | 428/195 |
| 5,086,946 | 2/1992 | Blackwell et al. | 221/45 |
| 5,158,205 | 10/1992 | Bodziak et al. | 221/51 |
| 5,165,570 | 11/1992 | Windorski | 221/46 |
| 5,271,522 | 12/1993 | Ko et al. | 221/58 |
| 5,299,712 | 4/1994 | Carlson et al. | 221/41 |
| 5,328,141 | 10/1994 | Carlson et al. | 221/185 |
| 5,328,653 | 7/1994 | Hyde et al. | 264/284 |
| 5,401,547 | 3/1995 | Blackwell | 428/40 |
| 5,409,773 | 4/1995 | Kessel et al. | 428/352 |
| 5,460,863 | 10/1995 | Kessel et al. | 428/352 |

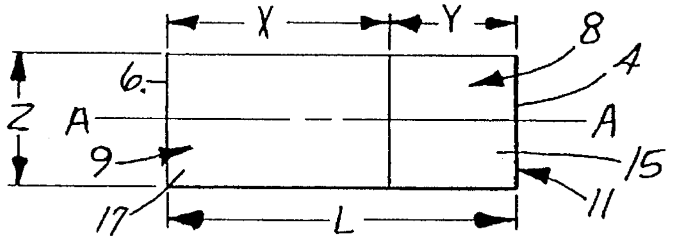
Fig 1C
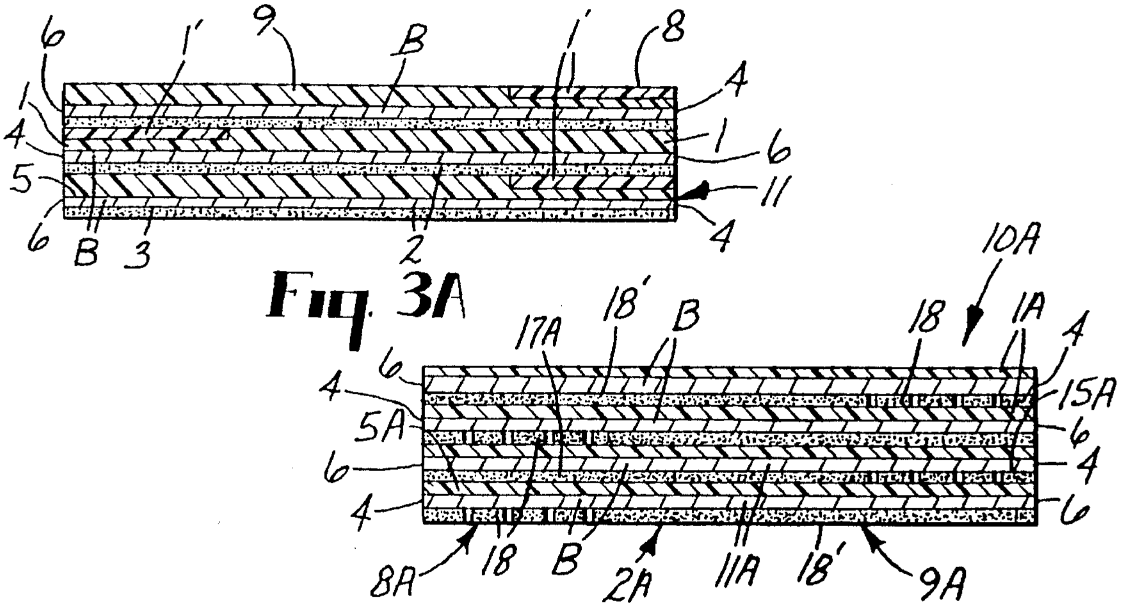
Fig. 3A
Fig. 3B
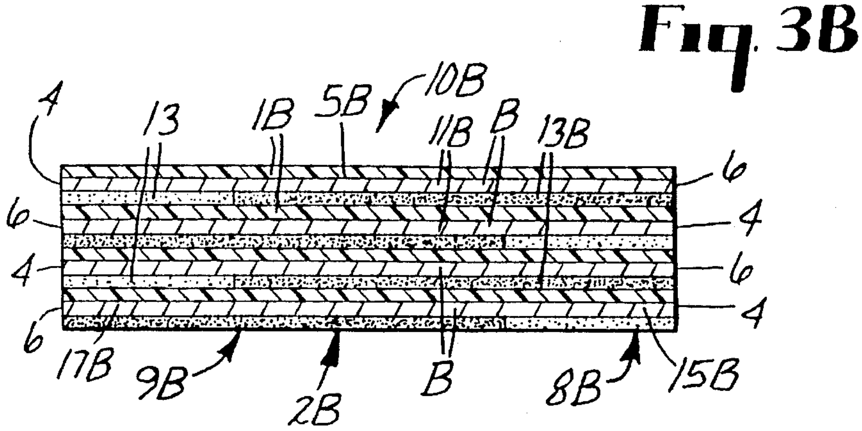
Fig. 3C

SHEET STACK

The present application is a continuation of prior application Ser. No. 80/141,421 filed on Oct. 20, 1993, now U.S. Pat. No. 5,401,547. The '421 application was a continuation of U.S. patent application Ser. No. 08/033,116 filed Mar. 18, 1993, now abandoned. The '116 application was a continuation of U.S. patent application Ser. No. 07/788,230 filed on Nov. 5, 1991, now abandoned. The '230 application was a divisional of U.S. patent application Ser. No. 07/625,311, filed Dec. 10, 1990, now U.S. Pat. No. 5,086,946.

TECHNICAL FIELD

The present invention relates generally to pre-cut lengths of pressure sensitive adhesive coated sheets for joining one surface to another surface.

BACKGROUND ART

The art is replete with structures for adhesive coated sheets adapted to connect or join one surface to another surface. Tape from #810 MAGIC™ transparent tape available from Minnesota Mining and Manufacturing Company, St. Paul, Minn. is used extensively for a variety of purposes and is conventionally dispensed from a roll of such tape on a roll type dispenser such as the dispensers disclosed in Walker et al. U.S. Pat. No. 4,928,864 and Reinecke U.S. Design Patent 116,599. Such a roll of tape must be manually cut by cutting means which is located on the dispenser. It is difficult for the user to manually cut precise, uniform lengths of the adhesive coated tape from the roll as it is difficult-to repeatedly measure the lengths precisely. Such a tape/dispenser combination is not suitable for situations which require quick and efficient dispensing of precisely uniform, pre-cut lengths of adhesive coated tape.

It is also known to dispense MAGIC™ transparent tape from a pad of tape strips as described in Emmel U.S. Pat. No. 4,650,706. Emmel discloses a pad of tape strips where the length of a tape tab formed at one end of each tape strip extending from one end toward an opposite end is progressively greater from one side of the pad to the other. Emmel teaches that separation of the tape strip with the longest tape tab may be accomplished by grasping the tape tab and peeling the strip from the pad without separation of the next adjacent strip. Thus, a person desiring a sheet must manually separate an edge of a top sheet from the rest of the sheets in the stack and peel that sheet away, which is inconvenient, particularly when only one hand is available to remove the sheet. Such a stack is not suitable for situations where the user requires the use of both hands for operations other than the dispensing of the tape, such as, for example, gift wrapping.

Mettens U.S. Pat. No. 4,895,746 discloses a stack of adhesive coated sheets, such as labels comprising release means and attachment means which provide means for easy release of the top sheet in the stack of sheets. Mettens does not disclose placing the release means on alternating opposite edges of the sheets in the stack. Thus, similar to the tape strips taught by Emmel, a person desiring a sheet must manually separate an edge of a top sheet from the rest of the sheets in the stack and peel that sheet away, which is inconvenient, particularly when only one hand is available to remove the sheet. Mertens also does not disclose a container for the adhesive coated sheets adapted to enclose and protect the sheets.

Heretofore it is known to provide a stack of partially adhesive coated sheets stacked with the adhesive coating along alternate opposite sides of the stack to thereby releasably adhere the sheets together. Such sheets may be conveniently dispensed from a container using only one hand. Sheets from Post-it™ note pads and Post-it™ tape flags available from Minnesota Mining and Manufacturing Company of St. Paul, Minn. are used extensively as such sheets. Post-it™ tape flags and an associated dispenser are disclosed in U.S. Pat. No. 4,770,320 to Miles et al. Z-stacked sheets and associated dispensers are disclosed in Loder U.S. Pat. Nos. 4,562,938; 4,586,629; Smith U.S. Pat. No. 4,416,392; and Mertens U.S. Pat. No. 4,653,666. Such sheets are not suitable for joining or connecting a pair of surfaces together, however, because relatively small percentages of such sheets are coated with repositionable pressure sensitive adhesive. Also, such sheets are not suitable for joining or connecting a pair of surfaces together because the pressure sensitive adhesive is a relatively weak adhesive, because some of the sheets are made of paper and easily become damaged, and because the sheets are at least partially opaque so that they obscure more of the joined surfaces than desired.

DISCLOSURE OF THE INVENTION

The present invention provides a stack of pre-cut sheets coated with a relatively strong, aggressive adhesive that can be used to adhere two surfaces together. The stack of sheets has a large portion of each individual sheet coated with a relatively aggressive adhesive to provide secure engagement between two joined surfaces, withstand relatively heavy handling without damage and yet provide an uppermost sheet which may be easily removed from the top of the stack and have its surface firmly adhered to a substrate along all of its sides and edges, and does not obscure a significant part of the joined surfaces. The present invention is also directed to a simple, inexpensive and effective dispenser for dispensing the flexible sheets from the stack.

According to the present invention there is provided a stack of pre-cut sheets disposed one on top of another, each sheet comprising a backing having first and second opposite major side surfaces and first and second opposite ends with the first end of each sheet being in alignment with the second end of an adjacent sheet in the stack, and a layer of adhesive permanently adhered to the first side surface of the sheet backing, the layer of adhesive of each sheet being releasably adhered along the second surface of the adjacent (lower) sheet in the stack. Each of the sheets comprises release means for providing a first adhesion level along a first end portion of each of the sheets adjacent the first end of the backing between the layer of adhesive and the second side surface of the adjacent (lower) sheet in the stack. The first adhesion level provides a sufficiently low release force (e.g. preferably less than 50 grams per inch; 1.97 grams/mm) between the adhesive coating and the adjacent (lower) sheet to afford sliding movement between the side surfaces of the adjacent sheets along the first end portion. Attachment means are present for providing a second adhesion level along a second end portion of each of the sheets adjacent the second end of the backing between the layer of adhesive and the second side surface of the adjacent sheet in the stack to which the layer of adhesive is releasably adhered. The second adhesion level provides a release force (preferably between 4 and 15 ounces per inch; which is between 5 grams/mm and 17 grams/mm) that is higher than the low release force along the first end portion and firmly adheres the sheet to the adjacent (lower) sheet in the stack during sliding movement of the sheet relative to the adjacent sheet along the first end portion while affording peeling away (e.g. manual) of the sheet along the second end portion.

The release means for providing the first adhesion level and the attachment means for providing the second adhesion level can comprise a variety of structures including, but not limited to one or combinations of (1) providing a uniform coating of the same pressure sensitive adhesive on each of the sheets together with a coating of low adhesion backsize on the portion of the upper surface of each sheet only along the first end portion, or providing different low adhesion backsizes on the upper surface of each sheet along the first and second end portions, with the low adhesion backsize in the first end portion having the greatest release factor; (2) making the coating of pressure sensitive adhesive along each of the sheets discontinuous along the first end portion and continuous along the second end portion, or discontinuous along both portions with greater discontinuities along the first end portion than along the second; and/or (3) using different pressure sensitive adhesives along the two end portions. For example, a stack of the sheets may comprise a layer of adhesive coated over an entire first major side surface of the backing of each of the sheets, the attachment means may comprise a layer of medium release low adhesion backsize (LAB) coated over at least a portion of the second major side surface adjacent the second end of the sheet, and the release means may comprise a layer of premium release low adhesion backsize (LAB) coated over a portion of the second major side surface adjacent the first end of the sheet. In this example, the sheets in the stack may have a length along a longitudinal axis and a width along a direction perpendicular to the longitudinal axis of the stack. The layer of premium release low adhesion backsize (LAB) is continuous, extends from the first end of the backing along the length of the sheet and comprises between ten (10) and eighty (80) percent of the area of a side of the backing of each sheet in the stack. Preferably the premium release low adhesion backsize (LAB) layer comprises generally about thirty-seven and one-half percent of the area of a side of the backing of each sheet in the stack.

Generally, as used herein, "sheet material" means a generally flat, flexible structure, preferably acetate, brightened acetate film, unbrightened acetate film, thermoset film, thermoplastic film, polyester, polypropylene, vinyl, paper, metal foil or combinations of the above mentioned materials. Preferably the sheet material is transparent to allow a user to see the underlying substrate.

Low adhesion backsize refers to a material which readily releases from a layer of pressure sensitive adhesive and includes, but is not limited to, silicones, fluorocarbons, acrylates, urethanes, chrome complexes, grafted or block siloxane hydrocarbons, and blends of these materials. Examples of various low adhesion backsizes are found in U.S. Pat. No. 4,421,904 to Eckberg et al.; U.S. Pat. No. 4,313,988 to Koshar et al.; and U.S. Pat. No. 4,279,717 to Eckberg et al. the entire specifications of which are herein expressly incorporated by reference. Other low adhesion backsizes which may be used according to the present invention are described in U.S. Pat. No. 2,607,711 to Hendricks; U.S. Pat. No. 2,876,894 to Dahlquist; and U.S. Pat. No. 2,532,011 to Dahlquist et al. the entire specifications of which are also herein incorporated by reference.

Generally, as used herein, "premium release low adhesion backsize" means an adhesive/backsize interaction with a minimum release force of 100 grams per inch or lower, and "medium release low adhesion backsize" means an adhesive/backsize interaction with a release force of at least 150 grams per inch or higher.

The pressure sensitive adhesive may be of an acrylic, silicone, rubber-resin, or any other suitable composition. For example, the adhesive may comprise acrylic adhesive IOA(95%)/AA (4.5%) Iso-octyl acrylate/Acrylic Acid. Adhesives for use with the present invention are described in U.S. Pat. No. 4,699,842 to Jorgensen et al.; U.S. Pat. No. 3,578,622 to Brown et al.; U.S. Pat. No. 3,331,729 to Danielson et al.; U.S. Pat. No. 2,926,105 to Steinhauser et al. and U.S. Pat. No. 4,835,217 to Jorgensen et al. the entire specifications of which are herein expressly incorporated by reference. A relatively weak adhesive such as Acrylic Microspheres (IOA-ammonium acrylate) is also contemplated as an adhesive for use according to the present invention. For example, the relatively weak adhesive may be prepared according to U.S. Pat. No. 3,691,140 to Silver the entire specification of which is also herein incorporated by reference.

The dispenser of the present invention comprises walls having surfaces defining a cavity adapted to receive the stack. The walls include (1) a bottom abutment wall defining a bottom surface, (2) end walls defining end surfaces at opposite ends of the bottom surface and having generally parallel outer ends, and (3) arcuate wall portions generally opposite the bottom abutment wall extending generally toward each other from the outer ends and having spaced distal ends, the arcuate wall portions defining arcuate friction surface portions. Opposed outlet surfaces are provided at the distal ends and define an opening through the walls.

The arcuate friction surface portions and the bottom surface are shaped to afford reciprocating movement of the stack of sheets within the cavity in response to forces applied to the stack to sequentially remove sheets from the stack through the opening, and to position the uppermost sheets of the stack adjacent the arcuate friction surface portions with the second end portion of the uppermost sheet in the stack projecting through the opening so that by grasping that second end portion, the uppermost sheet in the stack can be manually pulled through the opening and will carry with it the second end portion of the sheet beneath it in the stack to which the uppermost sheet is adhered by the adhesive coating, placing that second end portion in a position where it also may be grasped and pulled to withdraw that sheet from the stack. The arcuate friction surface portions are further shaped to provide means for affording sliding movement of the adhesively joined first end portion of the uppermost sheet and the second end portion of the sheet beneath the uppermost sheet between the second side surface of a subsequent sheet in the stack and the adjacent arcuate friction surface portion, and for making sufficient frictional engagement with the second side surface of the sheet beneath the uppermost sheet to restrict the movement of the sheet beneath the uppermost sheet between the rest of the stack and the adjacent arcuate friction surface portion to thereby afford peeling separation between the uppermost sheet and the sheet beneath it after the uppermost sheet is withdrawn from the dispenser.

BRIEF DESCRIPTION OF THE DRAWING

The present invention will be further described with reference to the accompanying drawing wherein like reference numerals refer to like parts in the several views, and wherein:

FIG. 1C is a top view of the sheet of FIG. 1B showing first and second end portions;

FIG. 3A is a sectional side view of the first embodiment of stack according to the present invention;

FIG. 3B is a sectional side view of a second alternative embodiment of stack according to the present invention;

FIG. 3C is a sectional side view of a third alternative embodiment of stack according to the present invention;

DETAILED DESCRIPTION

Figure 1A:
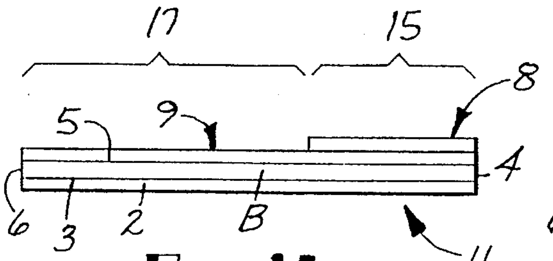
FIG. 1A is a sectional side view of a sheet in the first embodiment of stack according to the present invention.

Referring now to FIGS. 1A, 1B, 1C, 2, 3A and 6A through 6D of the drawing, there is shown a first embodiment of a stack 10 (FIG. 3A) of sheets 11 according to the present invention, each of which sheets 11 comprise a backing B having a coating of pressure sensitive adhesive 2 on a first major side surface 3 by which the sheet 11 may be adhered to a sheet beneath it in the stack 10, a second major side surface 5, and opposite first 4 and second 6 ends with the first end 4 of each sheet backing in alignment with the second end 6 of an adjacent sheet to form the stack 10.

Release means 8 provide a first adhesion level along a first end portion 15 of each of the sheets 11 adjacent the first end 4 of the backing B between the layer of adhesive 2 and the second side surface 5 of the adjacent (lower) sheet in the stack 10. The first adhesion level provides a sufficiently low release force (e.g. preferably less than 50 grams per inch; 1.97 grams/mm) between the adhesive layer 2 and the adjacent (lower) sheet to afford sliding movement (e.g. see FIGS. 6A–6D) between the side surfaces 3, 5 of the adjacent sheets (e.g. the sheet 14 beneath the uppermost sheet and the sheet 16 below the sheet 14, FIG. 6C) along the first end portion 15. Attachment means 9 provide a second adhesion level along a second end portion 17 of each of the sheets adjacent the second end 6 of the backing B between the layer of adhesive 2 and the second side surface 5 of the adjacent (lower) sheet in the stack to which the layer of adhesive 2 is releasably adhered. The second adhesion level provides a release force (preferably between 4 and 15 ounces per inch; 5 grams/mm and 17 grams/mm) that is higher than the low release force along the first end portion 15 and firmly adheres the sheet (e.g. 12) to the adjacent sheet (e.g. 14) in the stack during sliding movement of the sheet (e.g. 14) relative to the adjacent sheet (e.g. 16, see FIG. 6C) along the first end portion 15 while affording peeling away (e.g. manual) of the sheet (e.g. 12) along the second end portion 17 (see FIG. 6D).

Preferably, the layer of pressure sensitive adhesive is uniform, of the same adhesive composition, and has an adhesion to glass of less than 15 ounces per inch (17 grams/millimeter). For example, the adhesive may comprise acrylic adhesive IOA(95%)/AA (4.5%) Iso-octyl acrylate/ Acrylic Acid. Adhesives for use with the present invention are described in U.S. Pat. Nos. 4,699,842 to Jorgensen et al.; U.S. Pat. No. 3,578,622 to Brown et al.; U.S. Pat. No. 3,331,729 to Danielson et al.; U.S. Pat. No. 2,926,105 to Steinhauser et al. and U.S. Pat. No. 4,835,217 to Jorgensen et al. the entire specifications of which are herein expressly incorporated by reference.

Figure 1B:
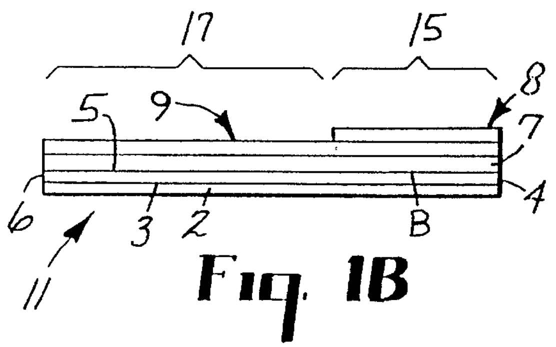
FIG. 1B is a sectional side view of a sheet in the first embodiment of stack according to the present invention which includes a primer layer.

FIG. 1B is similar to FIG. 1A except that a primer 7 has been added to the second major side surface 5 of the backing B of the sheet 11. Additionally, a primer (not shown) may be added to the first major side surface 3 of the backing B of the sheet 11. The primers are optional and where the release means 8 or the adhesive 2 does not naturally adhere to the sheet 11, primers known in the art may be used without affecting the release performance of the release means 8 or the adhesive 2.

FIG. 1C illustrates a generally rectangular sheet 11 having a longitudinal axis A defining a length L (preferably 2.0 inches, 5.08 centimeters) and a width W. The area of the first end portion 15 of the sheet 11 shown in FIG. 1C is the length Y (preferably 0.75 inches, 1.90 centimeter) of the release means 8 multiplied by the length Z (the width of the sheet, preferably 0.75 inches, 1.90 centimeters). The area of the second end portion 17 of the sheet 11 shown in FIG. 1C is the length X of the attachment means 9 multiplied by the length Z (the width of the sheet). Generally, the first end portion 15 extends from the first edge 4 along the length of the sheet 11 and comprises between ten (10) and eighty (80) percent of the area of a side of each sheet 11 in the stack 10.

Preferably, the first end portion 15 comprises generally about thirty-seven and one-half percent of the area of a side (for example 5) of the backing B of each sheet 11 in the stack. Correspondingly, the second end portion 17 extends from the second edge 6 along the length of the sheet 11 and comprises between twenty (20) and ninety (90) percent of the area of a side of the backing B of each sheet in the stack 10. Preferably, the second end portion 17 comprises generally about sixty-two and one-half percent of the area of a side of each sheet in the stack. It should be noted that the sheet 11 shown in FIG. 1C is rectangular, however, various shapes are included within the scope of the invention including but not limited to square, circular, triangular and polygonal shapes and combinations thereof.

In order to individually dispense a single sheet 11 from the stack 10 of sheets, the release means 8 should provide a release force of less than about 50 grams per inch (1.97 grams/mm) along the first end portion 15, and the attachment means 9 should provide a release force of greater than about 4 ounces per inch (5 grams/mm) and less than about 15 ounces per inch (17 grams/mm) along the second end portion 17. If the release force of the release means 8 is too high (e.g. greater than about 50 grams per inch), only one sheet will peel off the top of the stack 10 since the high release force would prevent the sliding movement of the two uppermost sheets 12, 14 in the stack 10 relative to the subsequent adjacent sheet 16 (For example, see FIGS. 6A–6D). If the release force of the attachment means 9 is too high (e.g. greater than 15 ounces per inch), it becomes difficult to peel the uppermost sheet 12 from the sheet 14 beneath it and an undesirable "chaining" results wherein several sheets are concurrently dispensed without separating. If the release force of the attachment means 9 is too low (e.g. less than 4 ounces per inch), however, there is no sliding movement of the two uppermost sheets 12, 14 in the stack 10 relative to the subsequent adjacent sheet 16 since the uppermost sheet 12 would peel off the sheet 14 below the uppermost sheet before the sliding could occur. Preferably the release means 8 has a release force of about 2 grams per inch (0.097 grams/mm) along the first end portion 15 and the attachment means 9 should provide a release force of about 4 ounces per inch (5 grams/mm) along the second end portion 17.

Referring now to FIG. 3A of the drawing, there is shown an example of a first embodiment of a stack of sheets according to the present invention, generally designated by the reference numeral 10. The stack 10 of sheets 11 may comprise a layer of adhesive 2 coated over an entire first major side surface 3 of the backing B of each of the sheets 11, a first layer of medium release low adhesion backsize 1 (LAB) coated over a second major side surface 5 of the backing B along at least the second end portion 17 adjacent the second edge 6 of the sheet 11, and a second layer of premium release low adhesion backsize 1' (LAB) coated over the second major side surface 5 along the first end portion 15 adjacent the first edge 4 of the sheet 11. The backing B may comprise for example, an acetate backing as described in U.S. Pat. No. 2,927,868 the entire specification of which is herein incorporated by reference. The sheets 11 are stacked with the premium release low adhesion backsize 1' (LAB) on each successive sheet disposed along alternative opposite ends of adjacent sheets 11 in the stack 10 with the first end d of one sheet aligned with the second end 6 of the adjacent sheets and with the adhesive coating 2 of one sheet releasably adhering the one sheet to the second major side surface 5 of a successive (lower) sheet to maintain the sheets in the stack 10. It should be noted that while FIG. 3A illustrates the premium release low adhesion backsize 1' coated on top of the medium release low adhesion backsize 1, the stack 10 could be constructed with the premium release low adhesion backsize 1' coated directly to the second major side surface 5 of the backing B of the sheet 11.

Referring now to FIG. 3B of the drawing, there is shown a second alternative embodiment of a stack of sheets according to the present invention, generally designated by the reference numeral 10A which has many parts that are essentially the same as the parts of the stack 10 of sheets 11 and which have been identified by the same reference number to which the suffix "A" has been added. In FIG. 38, the release means 8A for providing the first adhesion level, and the attachment means 9A for providing the second adhesion level comprise making the coating of pressure sensitive adhesive 2A on the backing B of each of the sheets 11A discontinuous 18 along the first end portion 15A and continuous 18' along the second end portion 17A. Such a stack 10A may include only a single layer 1A of low adhesion backsize along the second major surface 5A of the backing B of sheet 11A. Alternatively the release means 8A for providing the first adhesion level, and the attachment means 9A for providing the second adhesion level may comprise making the coating of pressure sensitive adhesive 2A on the backing B of each of the sheets 11A discontinuous in both portions (not shown) with greater discontinuities in the first end portion 15A than in the second end portion 17A.

Referring now to FIG. 3C of the drawing, there is shown a third alternative embodiment of a stack of sheets according to the present invention, generally designated by the reference numeral 10B which has many parts that are essentially the same as the parts of the stack 10 of sheets 11 and which have been identified by the same reference number to which the suffix "B" has been added. In FIG. 3C, the release means 8B for providing the first adhesion level and the attachment means 9B for providing the second adhesion level comprise changing the composition of the coating of pressure sensitive adhesive 2B along the first 15B and the second 17B end portions. Like the stack 10A, the stack 10B may include only a single layer 1B of low adhesion backsize along the second major surface 5B of the backing B of sheet 11B. As an example of the stack 10B, the adhesive 13 used along the first end portion 15B may be a relatively weak or low aggressive adhesive, such as described in U.S. Pat. No. 3,691,140 to Silver. An adhesive that is particularly suitable for use along the first end portion 15B may comprise Acylic Adhesive or Acrylic microspheres. The adhesive 13B used in the second adhesion zone 17B may be a relatively aggressive or strong adhesive, such as Acrylic Adhesive, Rubber resins, or Kraton. Adhesives for use with the present invention may be prepared according to U.S. Pat. No. 4,699,842 to Jorgensen et al. and U.S. Pat. No. 4,835,217 to Jorgensen et al.

The pre-cut sheets of the present invention are particularly useful for tasks which generally require the use of both hands for operations other than the dispensing of the tape, such as for example, gift wrapping, wire marking and highlighting.

Referring now to FIGS. 4 through 7 of the drawing, there is shown a first embodiment of dispenser according to the present invention generally designated by the reference numeral 20. The dispenser 20 is used in dispensing the flexible sheets from the stack (e.g. 10) also according to the present invention as described above.

The dispenser of the present invention comprises walls 22 having surfaces defining a cavity 23 which is adapted to receive the stack 10. Those walls 22 include a bottom abutment wall 24 defining a bottom surface 24', end walls 25 defining end surfaces 25' at opposite ends of the bottom surface 24' and having generally parallel outer ends 26, and arcuate wall portions 28 generally opposite the bottom abutment wall 24 extending generally toward each other from the outer ends 26 and having spaced distal ends 29. The arcuate wall portions 28 define arcuate friction surface portions 28' which extend between the outer ends 26 and the distal ends 29.

Figure 6A:
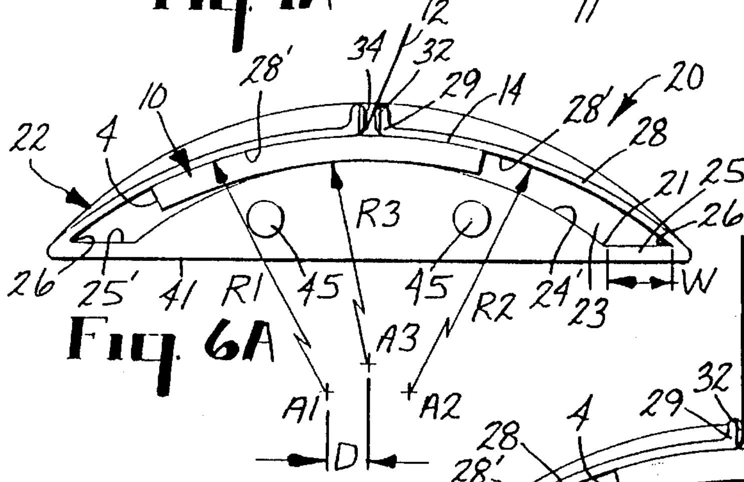
FIGS. 6A–6D sequentially illustrate the movement of the stack, an uppermost sheet in the stack and a sheet beneath the uppermost sheet relative to the dispenser as the uppermost sheet is withdrawn from the dispenser illustrated in FIG. 4 with the weighted base omitted to show detail.

Opposed outlet surfaces 32 are provided at the distal ends 29 and define an opening 34 through the walls 22. The arcuate friction surface portions 28' and the bottom surface 24' may be shaped to cause the stack 10 to be arched to thereby generally conform the upper surface of the stack 10 to the arcuate friction surface portion 28' of the arcuate wall portions 28. As illustrated in FIG. 6A, the arcuate wall portions 28 are cylindrically concave about a pair of spaced axes A1, A2 parallel to the outer ends 26 and defining distinct radii R1, R2 of generally the same length (preferably 2.54 inches, 6.54 centimeters to the arcuate friction surface portion). The arcuate wall portions 28 have an arc length of preferably about 1.75 inches (4.45 centimeters). The bottom abutment wall 24 may be arcuate, cylindrically concave about an axis A3 spaced from the axes A1, A2 and defining a radius R3 (preferably 2.28 inches, 5.59 centimeters to the bottom surface) with the lateral distance D between the axis A3 and either axis A1 or A2 preferably approximately 0.141 inches (0.36 centimeters) such that the width W of the cavity 23 increases from the opening 34 toward the end walls 25.

Alternatively the arcuate wall portions 28 and the bottom abutment wall 24 could be flat planar elements formed by straight portions or a combination of straight or arcuate portions provided the overall effect is to position the uppermost sheets in the stack 10 proximate the arcuate friction surface portions 28' of the arcuate wall portions 28 and provides the function described below during dispensing of sheets 11 from the dispenser 20.

The arcuate friction surface portions 28' and the bottom surface 24' are shaped to afford reciprocating movement of the stack 10 of sheets within the cavity 23 in response to forces applied to the stack 10 to sequentially remove sheets from the stack through the opening 34, and to position the uppermost sheets of the stack 10 adjacent the arcuate friction surface portions 28' with the second end portion 17 of the uppermost sheet 12 in the stack projecting through the opening 34. By grasping that second end portion 17, the uppermost sheet 12 in the stack can be manually pulled through the opening 34 and will carry with it the second end portion 17 of the sheet 14 beneath it in the stack to which the uppermost sheet 12 is adhered by the adhesive coating 2, placing that second end portion 17 in a position where it also may be grasped and pulled to withdraw that sheet 14 from the stack 10.

Figure 6B:
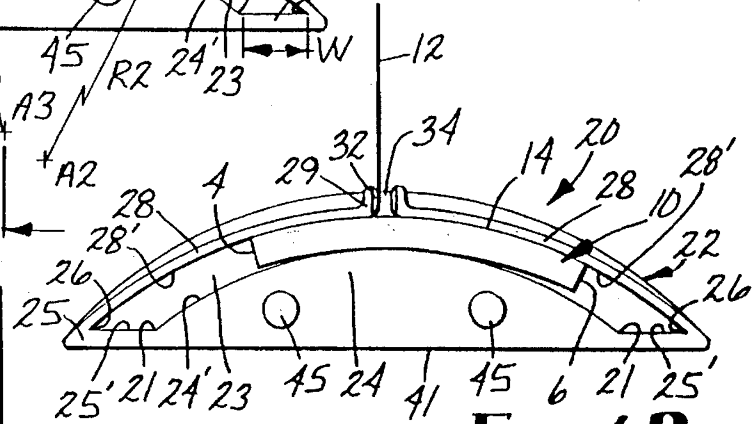
Figure 6C:
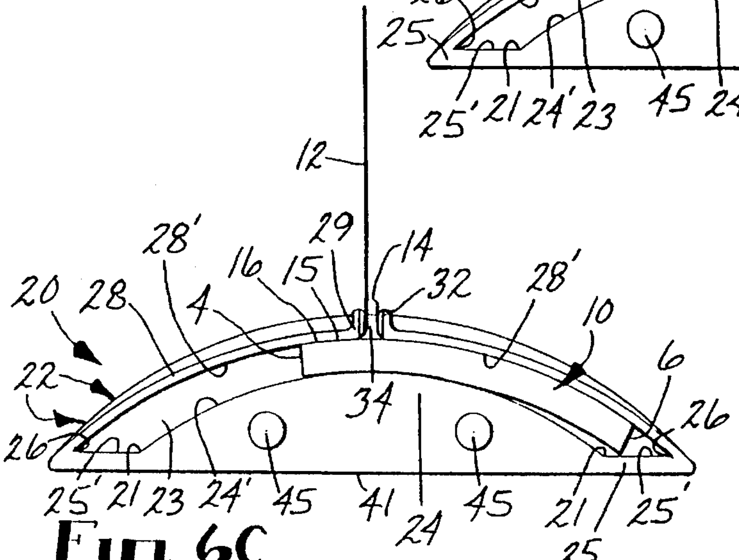
Figure 6D:
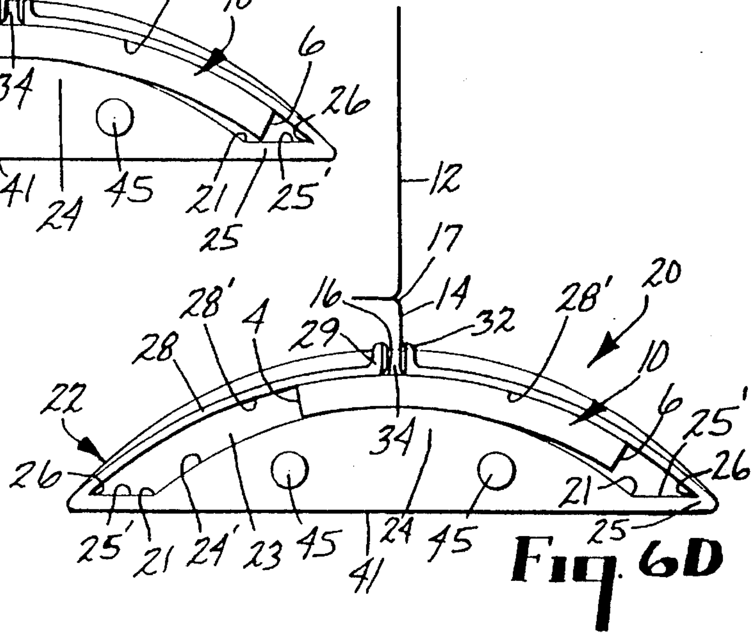

The arcuate friction surface portions 28' are further shaped to provide means for affording sliding movement of the adhesively joined first end portion 15 of the uppermost sheet 12 and the second end portion 17 of the sheet 14 beneath the uppermost sheet between the second side surface 5 of a subsequent sheet 16 (FIG. 6C) in the stack 10 and the adjacent arcuate friction surface portion 28', and for making sufficient frictional engagement with the second side surface 5 of the sheet 14 beneath the uppermost sheet to restrict the movement of the sheet 14 beneath the uppermost sheet between the rest of the stack 10 and the adjacent arcuate friction surface portion 28' to thereby afford peeling separation between the uppermost sheet 12 and the sheet 14 beneath it after the uppermost sheet 12 is withdrawn from the dispenser 20 (see FIG. 6D).

The friction surface wall portions 28 and the bottom abutment wall 24 are spaced to define the cavity width W therebetween (FIG. 6A) which, as a result of the spacing between the axis A3 and the axes A1 and A2, increases from the opening 34 of the dispenser toward either end walls 25. This shape of the cavity 23 has been found to be particularly suitable for causing the top two sheets in the stack 10 to form the shape shown in FIG. 6C. This shape has been found to provide efficient dispensing of the sheets. Also, the cavity 23 has an overall arc length generally defined by the length along the bottom abutment wall 24 which is greater than the length L of the stack 10 to afford the reciprocating movement of the stack 10 of sheets within the cavity 23. The cavity width W increases from the opening 34 of the dispenser 20 toward the end walls 25 to provide additional room in the cavity 23 near the end walls 25 to prevent buckling of the stack 10 as the uppermost sheet 12 is being dispensed, particularly when the stack 10 is depleted to the last few sheets. Buckling of the stack 10 causes undesirable consequences such as a loss of the remaining sheets in the stack within the dispenser and damage to the sheets.

The use of a bottom sheet on the stack 10 that is more stiff than the other sheets 11 in the stack has been found to insure movement of the last few sheets 11 in the stack to positions adjacent the upper portion of the cavity 23 so that those last few sheets will be dispensed one at a time rather than all at once. The bottom sheet should not have any adhesive 2 adhered along its bottom surface to afford sliding movement along the bottom surface 24'.

Figure 7:
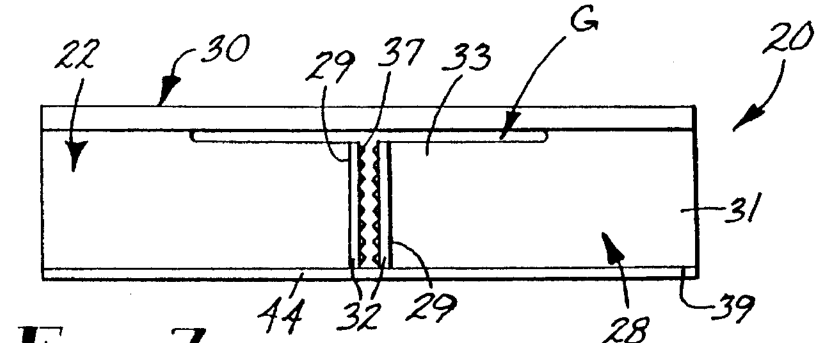
FIG. 7 is a top view of the first embodiment of dispenser container according to the present invention.

The opposed outlet surfaces 32 at the spaced distal ends 29 of the arcuate friction surface portions 28' define the opening 34. The opposed outlet surfaces 32 are spaced proximate one another to provide peeling separation between the uppermost sheet 12 and the sheet 14 beneath the uppermost sheet and also prevent those sheets from being concurrently dispensed without separating. As best seen in FIG. 7, the outlet surfaces 32 may include means in the form of a plurality of ribs 37 extending from a distal end of one friction surface portion 28' toward the other for preventing the adhesive 2 of the sheets 11 from "wetting" the opposed outlet surfaces 32. When the opposed outlet surfaces 32 become "wet" with the adhesive, the opening 34 becomes clogged and it becomes difficult to dispense the sheets 11 as the adhesive 2 on the opposed outlet surfaces 32 causes the uppermost sheets in the stack 10 to adhere to the dispenser 20. Such action obstructs the passage of the sheets 11 through the opening 34.

The distance between a pair of ribs 37 located on opposite outlet surfaces 32 should be at least 0.060 inches (0.15 centimeters) but not more than 0.25 inches (0.64 centimeters) and preferably 0.080 inches (0.20 centimeters). The spacing between a pair of ribs 37 located on opposite outlet surfaces 32 has been found to be important and should be sufficiently wide to allow the uppermost sheet 12 and the sheet 14 beneath the uppermost sheet to pass through the opening 34 in the shape shown in FIG. 6C without causing one portion of the adhesive coated first major side 3 of the backing B of the sheet 14 beneath the uppermost sheet to contact another portion of the same side 3 of the sheet 14. Such contact between portions of the same adhesively coated side 3 of the backing B of sheet 14 causes many undesirable results such as a pinching of the sheet 14 and a "chaining" effect whereby several preselected sheets are concurrently dispensed without separating. The spacing between a pair of ribs 37 located on opposite outlet surfaces 32 should also be sufficiently narrow to afford peeling separation between the uppermost sheet 12 and the sheet beneath the uppermost sheet 14 after the uppermost sheet 12 has been completely withdrawn from the dispenser 20 (e.g. FIG. 6D). Should the spacing between the ribs 37 located on opposite outlet surfaces 32 be too wide, the entire stack of sheets 10 may tend to be withdrawn from the cavity 23 when the user attempts to withdraw the uppermost sheet 11, particularly when the stack of sheets 10 is depleted to only a few remaining sheets.

The walls 22 of the dispenser 20 may be included in a unitary structure (e.g., a polymeric molding of polystyrene, or a metal casting or a length of extrusion), and the arcuate wall portions 28 may include base portions 31 (FIG. 7) adjacent the outer ends 26 and flexible cantilever portions 33 which extend toward each other from the base portions 31 and toward the spaced distal ends 29. As shown in FIG. 6B (cf. FIG. 6A), the flexible cantilever portions 33 deflect in response to forces applied to the stack 10 to remove the uppermost sheet 12 from the stack 10. Making the flexible cantilever portions 33 flexible to afford such deflection decreases the amount of force required to remove the uppermost sheet 12 from the stack 10. It is believed that providing flexible cantilever portions provides a more desirable angle or orientation between the stack 10 and (1) the flexible cantilever portions 33 and (2) the opposed outlet surfaces 32 while the uppermost sheet 12 in the stack 10 is being dispensed. The flexibility of the flexible cantilever portions 33 may be controlled by a variety of factors such as the length of the groove G dividing the arcuate wall portions 28 into the flexible cantilever portions 33 and the base portions 31, and the material used to construct the dispenser 20.

The end walls 25, the arcuate wall portions 28, and the opposed outlet surfaces 32, and the bottom abutment wall 24 extend transversely entirely through the dispenser 20 generally parallel to the axes A1, A2 and A3 so that the cavity 23 has an end opening 27 opening through a side 39 of the dispenser 20, through which end opening 27 the stack 10 may be insertable into the cavity 23. Optionally, the dispenser 20 may include a removable shield 44 adjacent the side 39 and covering the opening 27. The shield 44 provides protection for the stack 10 as it reciprocates within the cavity 23. The shield 44 may be releasably attached to the dispenser 20 by a pair of cylindrical mounting pins (not shown) integral with the shield 44 which may be press fit into a pair of cylindrical apertures 45 defined by appropriately shaped surfaces in the dispenser 20 (See FIGS. 6A–6D). During use, the shield 44 may be removed to afford replacement of a depleted stack through end opening 27 and thereafter replaced on the dispenser 20 to cover the end opening 27.

Figure 4:
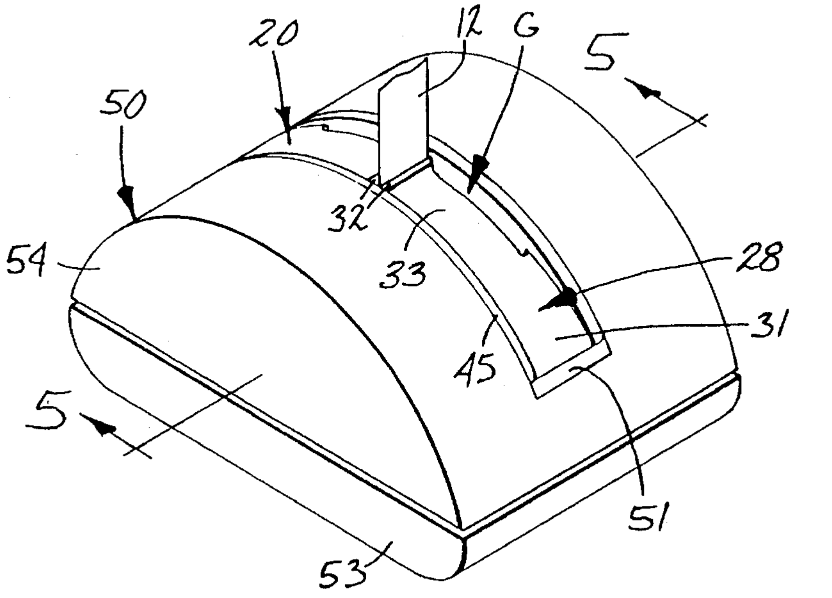
FIG. 4 is a perspective view of a first embodiment of dispenser container according to the present invention containing a stack of sheets also according to the present invention, and illustrating a weighted base for the dispenser.
Figure 5:
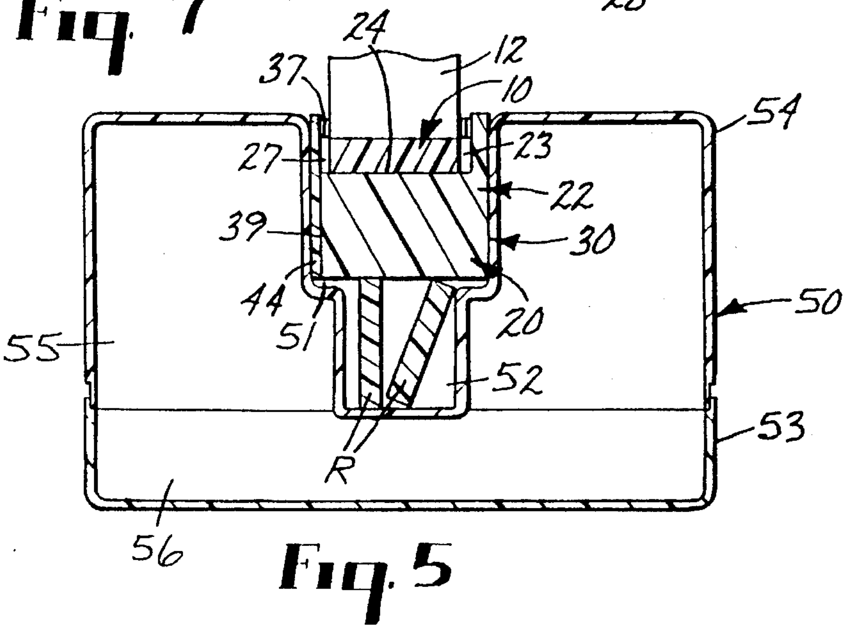
FIG. 5 is a sectional view of the dispenser, stack of sheets and base of the present invention shown in FIG. 4 taken approximately along lines 5—5 of FIG. 4.

FIGS. 4 and 5 illustrate a weighted base 50 for use with the dispenser 20 and the stack 10 of sheets according to the present invention. Means in the form of a close, tight friction fit between the outer surfaces 30 of the dispenser 20 and surfaces defining a chamber 51 in the weighted base 50 may be used to anchor the dispenser 20 to the weighted base 50. Preferably, the means for anchoring the dispenser 20 to the weighted base 50 should be releasable to afford removal of the dispenser 20 from the weighted base 50 to thereby afford replacement of a depleted stack 10 of sheets. Alternatively, along with a friction fit, the means for anchoring the dispenser to the weighted base 50 may comprise one or more flanges (not shown) integral with the weighted base and extending laterally adjacent a top portion of the dispenser when the dispenser is loaded into the weighted base portion. The flanges each may include detent means adapted to fit into surfaces defining grooves (not shown) located along a top portion of the dispenser to releasably retain the dispenser within the weighted base.

As illustrated in FIG. 5, the weighted base 50 may further include walls defining a replacement stack supply chamber 52. The replacement stack supply chamber 52 may be used to store additional replacement stacks R prior to their use.

The weighted base 50 may include two separate pieces including a base portion 53 and an upper portion 54 having walls defining a hollow 55. The base portion 53 is adapted to be detached from the upper portion 54 to provide means for filling the hollow 55 with ballast 56 such as sand, gravel or rocks. The base portion 53 may be snap-fit, glued, heat sealed or ultrasonically welded to the upper portion 54 to provide the weighted base 50.

The dispenser 20 of the present invention need not include the weighted base 50 and instead the dispenser 20 may include means in the form of rectangular foam pads (not shown) adhered to a base surface 41 of the dispenser 20 and having a coating of pressure sensitive adhesive on their surfaces opposite the base surface 41 that may prior to use be covered with a release liner (not shown) for adhesively anchoring the dispenser 20 to a substrate. Alternatively, the dispenser 20 may include a magnet (not shown) adhered to the base surface 41 for magnetically anchoring the dispenser 20 to a metal substrate.

Figure 8:
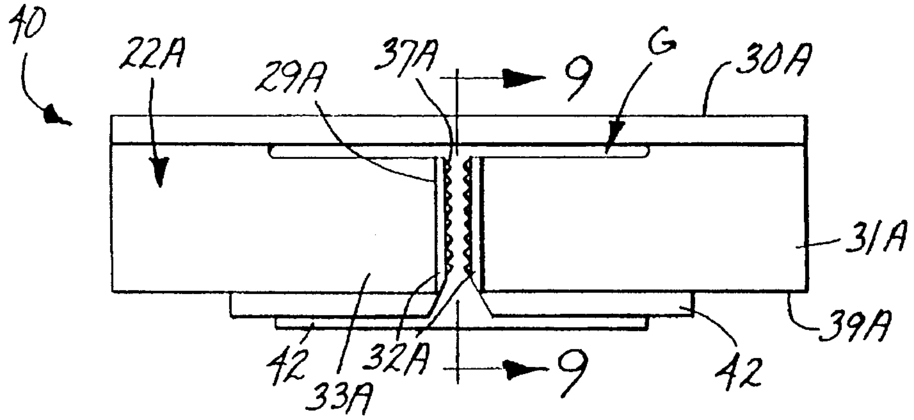
FIG. 8 is a top view of a second embodiment of dispenser according to the present invention.
Figure 9:
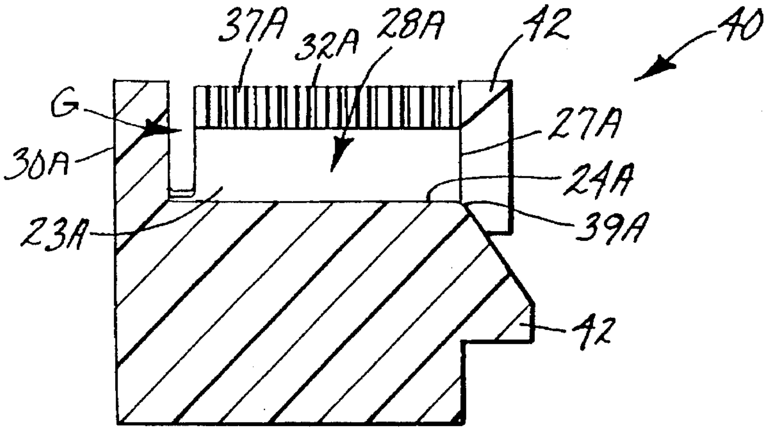
FIG. 9 is a sectional view of the second embodiment of dispenser according to the present invention taken approximately along lines 9—9 of FIG. 8.
Figure 2:
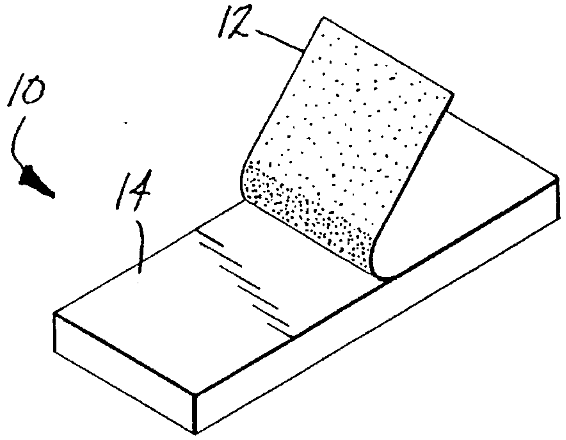
FIG. 2 is a perspective view of a first embodiment of stack of sheets according to the present invention.

Referring now to FIGS. 8 and 9 of the drawing, there is shown a second alternative embodiment of dispenser according to the present invention, generally designated by the reference numeral 40 which has many parts that are essentially the same as the parts of the dispenser 20 and which have been identified by the same reference number to which the suffix "A" has been added. The dispenser 40 is generally identical to the dispenser 20 except that the dispenser 40 further includes means in the form of lead-in guides 42 located adjacent the end opening 27A for assisting in the loading of a replacement stack 10 of sheets in the cavity 23A when the existing supply of sheets 11 is depleted. The lead-in guides 42 are located adjacent the side 39A of the dispenser 40 that includes the end opening 27A. There is no shield in the embodiment shown in FIGS. 8 and 9.

Figure 10:
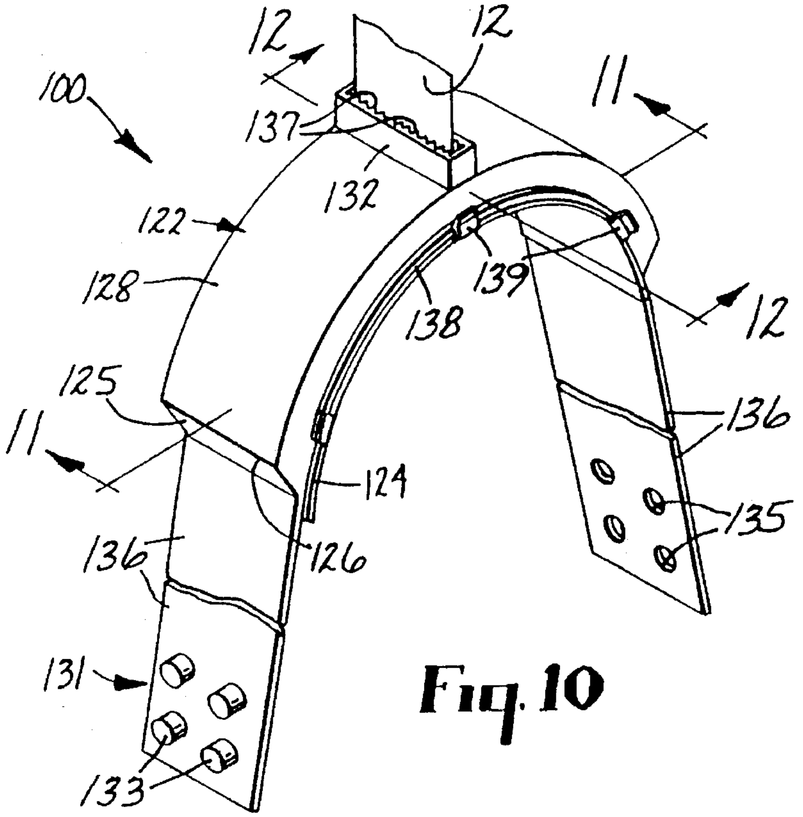
FIG. 10 is a perspective view of a third alternative embodiment of dispenser container according to the present invention containing a stack of sheets also according to the present invention.
Figure 11:
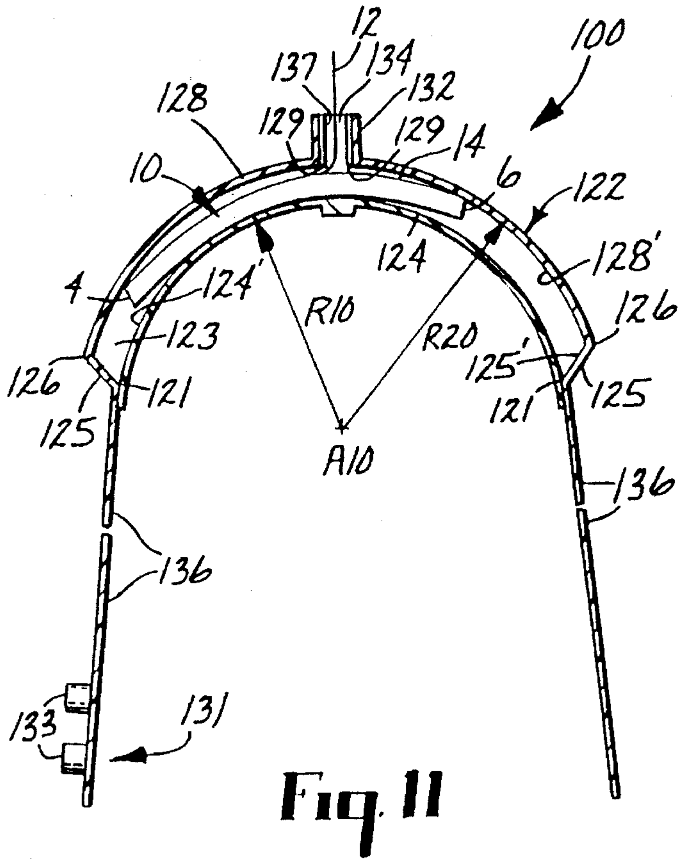
FIG. 11 is a sectional view of the dispenser and stack of sheets of FIG. 10 taken approximately along line 11—11 of FIG. 10.
Figure 12:
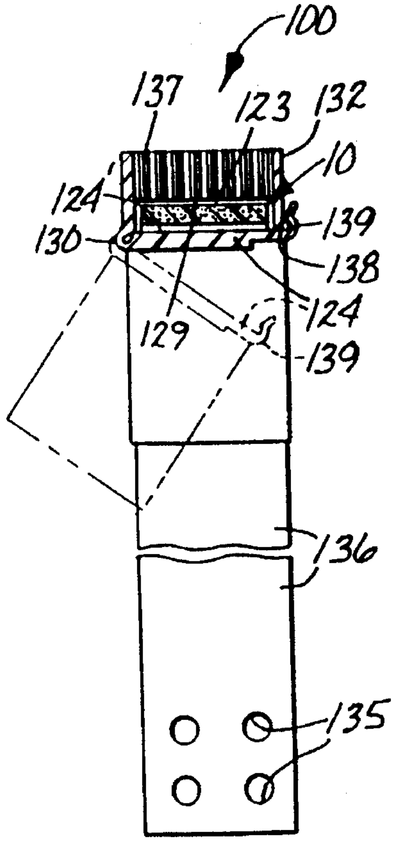
FIG. 12 is a sectional view of the dispenser and stack of sheets of FIG. 10 taken approximately along line 12—12 of FIG. 10.

Referring now to FIGS. 10 through 12 of the drawing, there is shown a third alternative embodiment of dispenser according to the present invention, generally designated by the reference numeral 100. The dispenser 100 is used in dispensing the flexible sheets from the stack (e.g. 10) also according to the present invention as described above. The dispenser 100 is particularly suitable for uses where the user requires the use of both hands for operations other than the dispensing of tape, such as in gift wrapping, wire marking and highlighting.

Like the dispenser 20, the dispenser 100 comprises walls 122 having surfaces defining a cavity 123 which is adapted to receive the stack 10. Those walls 122 include a bottom abutment wall 124 defining a bottom surface 124', end walls 125 defining end surfaces 125' at opposite ends of the bottom surface 124' and having generally parallel outer ends 126, and arcuate wall portions 128 generally opposite the bottom abutment wall 124 extending generally toward each other from the outer ends 126 and having spaced distal ends 129. The arcuate wall portions 128 define arcuate friction surface portions 128' which extend between the outer ends 126 and the distal ends 129.

The bottom abutment wall 124 extends between lower ends 121 of the end walls 125 which are located opposite and spaced from the outer ends 126. The walls 122 of the dispenser 100 may be included in a lightweight, unitary structure (e.g. a polymeric molding of polystyrene) with the bottom wall 124 attached to the rest of the dispenser 100 by an integral hinge 130 adapted to mount the bottom wall 124 for pivotal movement with respect to the friction wall portions 128 between an open position (FIG. 12 dashed lines) affording access to the cavity 123 to replace a depleted stack and a closed position (FIG. 12 solid lines) with the stack of sheets 10 enclosed within the cavity 123. Such a configuration is referred to as a "bottom loading" dispenser. It should be noted that the first and second embodiments of dispenser discussed above may also be modified to become "bottom loading" dispensers by having their bottom wall portions pivotally hinged with respect to the rest of the dispenser.

At the side of the bottom wall 124 opposite the hinge 130, the dispenser 100 may include one or more hooks 139 adapted to engage a flange 138 extending laterally from the dispenser 100 to retain the bottom wall 124 in the closed position.

An integral wristband 136 may be attached to the dispenser 100 adjacent both end walls 125 to afford convenient mounting of the dispenser 100 to the wrist of a user. Means 131 in the form of cylindrical mounting ribs 133 adapted to be press fit into apertures 135 may be provided to afford adjustment of the wristband 136 to accommodate wrists of various sizes. The means 131 may comprise any suitable attachment structure such as, but not limited to, hook and loops, a clamp or a spring wristband.

Opposed outlet surfaces 132 are provided at the distal ends 129 and define an opening 134 through the walls 122. The arcuate friction surface portions 128' and the bottom surface 124' may be shaped to cause the stack 10 to be arched to thereby generally conform the upper surface of the stack 10 to the arcuate friction surface portion 128' of the arcuate wall portions 128. As illustrated in FIG. 11, the friction surface portions 128 and the bottom wall 124 are cylindrically concave about an axis A10 parallel to the upper ends 126 and defining radii R10 (preferably 1.25 inches, 3.17 centimeters inner diameter with an arc length of 3.5 inches, 8.9 centimeters) and R20 (preferably 1.47 inches, 3.7 centimeters inner diameter with an arc length of 3.66 inches, 9.3 centimeters).

Alternatively the friction surface portions 128 and the bottom abutment wall 124 could be flat planar elements formed by straight portions or a combination of straight or arcuate portions provided the overall effect is to position the uppermost sheets in the stack 10 proximate the friction surface wall portions 128 and provides the function described below during dispensing of sheets 11 from the dispenser 100.

Unlike the dispenser 20, the friction surface wall portions 128 and the bottom abutment wall 124 of the dispenser 100 are spaced to define a generally uniform cavity width W therebetween (FIG. 11).

Like the dispenser 20, the cavity 123 has an overall surface length generally defined by the length along the bottom abutment wall 124 which is greater than the length L of the stack 10 to afford reciprocating movement of the stack 10 of sheets within the cavity 123 in response to forces applied to the stack to sequentially remove sheets 11 from the stack 10 through the opening 134. The arcuate friction surface portions 128' and the bottom surface 124' of the dispenser 100 are shaped to afford reciprocating movement of the stack 10 of sheets within the cavity 123 in response to forces applied to the stack 10 to sequentially remove sheets from the stack through the opening 134, and to position the uppermost sheets of the stack 10 adjacent the arcuate friction surface portions 128' with the second end portion 17 of the uppermost sheet 12 in the stack projecting through the opening 134. By grasping that end portion 17, the uppermost sheet 12 in the stack can be manually pulled through the opening 134 and will carry with it the second end portion 17 of the sheet 14 beneath it in the stack to which the uppermost sheet 12 is adhered by the adhesive coating 2, placing that second end portion 17 in a position where it also may be grasped and pulled to withdraw that sheet 14 from the stack 10.

The opposed outlet surfaces 132 at the spaced distal ends 129 of the friction surface portions 128 define the opening 134. The opposed outlet surfaces 132 are spaced proximate one another to provide peeling separation between the uppermost sheet 12 and the sheet 14 beneath the uppermost sheet and also prevent the uppermost sheet and the sheet beneath the uppermost sheet from being concurrently dispensed without separating. As best seen in FIG. 12, the outlet surfaces 132 may include means in the form of a plurality of ribs 137 extending from a distal end of one friction surface wall portion 128 toward the other for preventing the adhesive 2 of the sheets 11 from "wetting" the opposed outlet surfaces 32. The distance between a pair of ribs 137 located on opposite outlet surfaces 132 should be at least 0.060 inches (0.15 centimeters) but not more than 0.25 inches (0.64 centimeters) and preferably 0.080 inches (0.20 centimeters).

EXAMPLES 1–4

A stack of sheets of the type described with reference to FIG. 3A were made as follows. Example (1) was prepared by coating a 2.0 Mil 6 inch (15.24 centimeter) wide brightened acetate film with a medium release Low Adhesion Backsize (LAB) Octyl-Decylacrylate/Methyl-Acrylate/Acrylic Acid (known as a Terpolymer) with the following monomer ratios: (54/31/15) at 5% solids in Toluene. The medium release LAB was applied with a 250 Ruling Mil knurled rotogravure and dried at 150 degrees Fahrenheit, 65 degrees Celsius. The matte (second) side of the acetate film was coated with the medium release LAB along the entire second side surface. The acetate film was then stripe coated with a premium release Low Adhesion Backsize (LAB) GE-9300 Epoxy silicone U.V. polymer commercially available from GE Silicones 260 Hudson River Waterford, N.Y. 12188. The GE-9300 premium release Epoxy silicone was applied by using a 3 roll U.V. coater. The application roll used was a polyurethane rubber roll with 1 inch wide raised edges to produce a stripe 1 inch (2.54 centimeters) wide. The stripe was located 0.25 inches (0.63 centimeters) off each edge of a 6 inch (15.24 centimeters) wide roll of acetate film. The acetate film was then primed over the first major side surface with an acrylate primer at 5% solids in toluene. The primer was applied using a rotogravure 120-pyramidal knurled roll and dried at 150 degrees Fahrenheit, 65 degrees Celsius. The premium release low adhesion backsize (Epoxy silicone LAB) was applied on top of the medium release LAB. This created the desired differential release system for dispensing fully adhesive coated sheets, as discussed above.

The adhesive comprises 95% Iso-Octyl Acrylate 45% Acrylic acid as a solution copolymer 55% solids. The adhesive was applied to the first side surfaces at 4 grains/4 inch×6 inch. The adhesive may be prepared, for example, as described in U.S. Pat. No. 4,699,842 to Jorgensen et al. The pressure sensitive adhesive was applied using a fluid bearing die and dried at 150 degrees Fahrenheit, 65 degrees Celsius. The acetate backing was then slit in 3 inch (7.62 centimeters) stockrolls and z-stacked into a pad of sheets. The pads contain 50 to 75 sheets of fully coated material 0.75 inch (1.9 centimeters) wide and 2 inch (5.08 centimeters) in length.

Drag force measurement. The stack of sheets of the type described with reference to FIG. 3A was placed in a dispenser of the type described with reference to FIGS. 4, 5, 6A through 6D and 7. Drag force measurements were made on the pads using the following test procedure: The pad is placed in the dispenser as shown in FIG. 6A and the dispenser is attached to a 1000 gram weight metal block using adhesive backed material. The metal block is then placed on the base of a (DFG-2) DIGITAL FORCE GRAM GAUGE commercially available from Servco 6100 Blue Circle Drive, Minnetonka, Minn. The base is raised to a height of 3 to 4 inches (7.62 centimeters to 10.16 centimeters) and the uppermost tape strip is attached to a clip extended from the gauge. The base is then allowed to drop in free fall under the force of gravity. As the base falls one 0.75 inch×2 inch (1.9 centimeters×5.0 centimeters) piece of tape is dispensed from the dispenser. The procedure is repeated until all sheets in the pad are dispensed. Each sheet contains a medium release length X (see FIG. 1C) of 1.25 inches (3.2 centimeters) and a premium release length Y (see FIG. 1C) of 0.75 inches (1.90 centimeters). The results for example-1 appear in Table-1. The resultant force being measured is the total drag force or peak drag force to dispense one sheet from the dispenser. It is believed that the drag force actually measures two forces: (1) the force to dispense the uppermost sheet 12 from the dispenser 20 and (2) the force to peel the uppermost sheet 12 from the sheet 14 beneath it (see FIG. 6D). The entire pad is dispensed to determine how the peak drag force is changing throughout the pad stack. This is illustrated in a graph of examples 1–4 in FIG. 13.

Example-2 was prepared in the same manner as example-1 except 2.0 Mil unbrightened acetate was used and the medium release low adhesion backsize composition was Octyl-Decylacrylate/Methyl Acrylate/Acrylic Acid 50/45/5. The testing procedure for example 2 is the same as the testing procedure for example 1 and the results appear in Table-2.

Example-3 was also prepared in the same manner as examples 1 and 2 except that the medium release low adhesion backsize (LAB) was of the following composition: Octyl-decyl Acrylate/methyl Acrylate/Acrylic Acid at the following monomer ratios: 57/31/12. The drag force results appear in Table-3.

Figure 13:
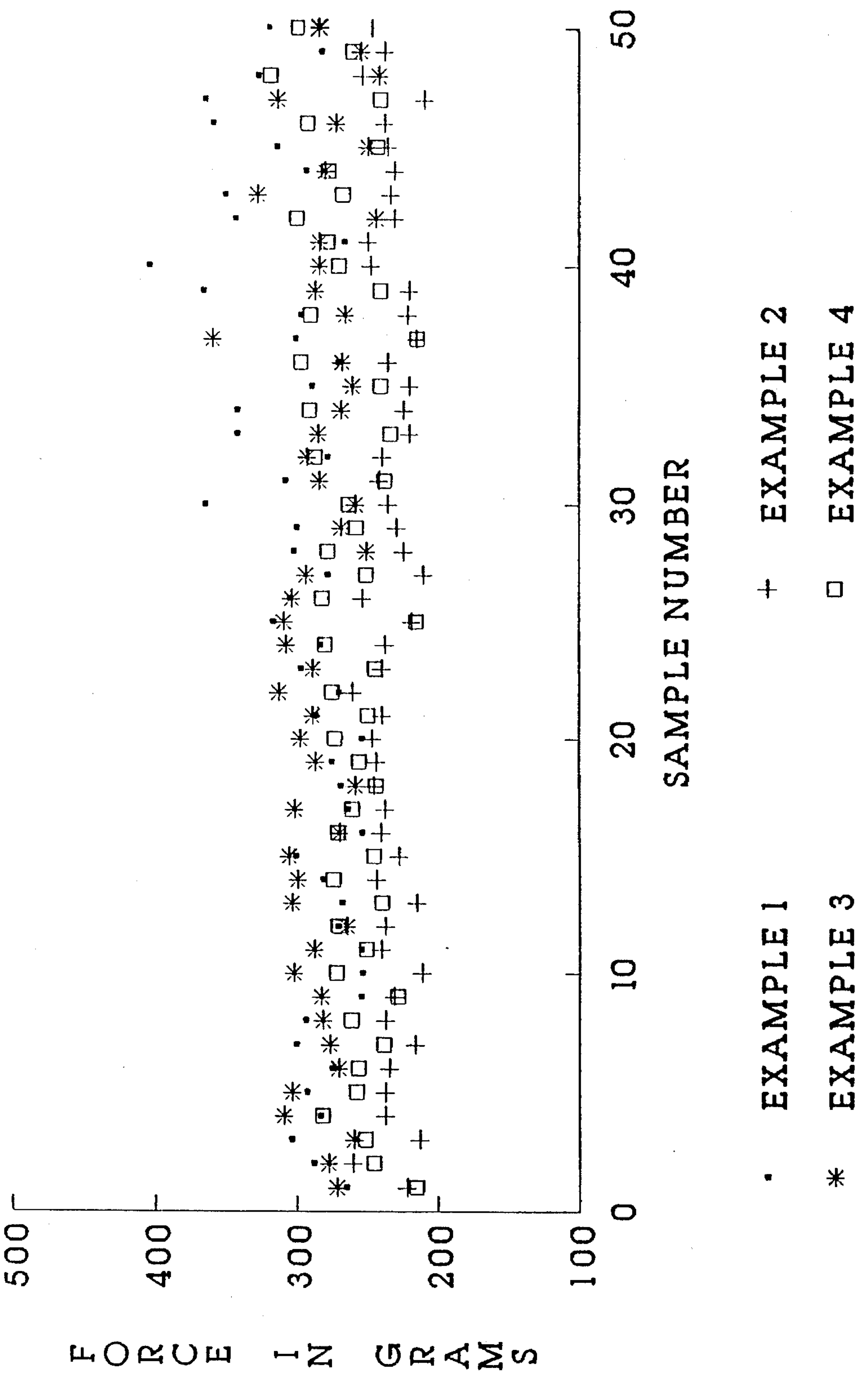
FIG. 13 is a representation of a test performed on the dispenser and stack according to the present invention.

For all examples the mean, medium, minimum, and maximum total drag forces are provided. A minimum drag force of about 180 grams is necessary to dispense the pads in the dispenser shown in FIG. 6A–6D (FIG. 13).

The preferred drag force is between 300 to 500 grams. These drag forces are critical to the function of the pad in the dispenser. The function of the stack and the dispenser are dependent upon the proper combination of medium release LAB's and premium release LAB's discussed above. In example-1 the mean drag force is 304 grams, the median is 328 grams, minimum is 253 grams, and the maximum is 403 grams. Generally, there are two types of failures. A failure occurs when the subsequent sheet does not pop out of the dispenser during the drag force test. A second failure occurs when multiple sheets are concurrently dispensed without separating.

TABLE 1

TOTAL DRAG FORCE DATA

| SAMPLE # | FORCE (GRAMS) | SAMPLE # | FORCE (GRAMS) | SAMPLE # | FORCE (GRAMS) |
|---|---|---|---|---|---|
| 1 | 264 | 26 | 304 | 51 | 326 |
| 2 | 287 | 27 | 277 | 52 | 372 |
| 3 | 303 | 28 | 301 | 53 | 337 |
| 4 | 282 | 29 | 299 | 54 | 378 |
| 5 | 292 | 30 | 364 | 55 | 267 FAIL |
| 6 | 274 | 31 | 307 | 56 | 327 |
| 7 | 300 | 32 | 277 | 57 | 371 |
| 8 | 293 | 33 | 341 | 58 | 378 |
| 9 | 254 | 36 | 269 | 59 | |
| 10 | 253 | 35 | 288 | 60 | |
| 11 | 254 | 36 | 269 | 61 | |
| 12 | 270 | 37 | 300 | 62 | |
| 13 | 267 | 38 | 296 | 63 | |
| 14 | 280 | 39 | 365 | 64 | |
| 15 | 300 | 40 | 403 | 65 | |
| 16 | 253 | 41 | 265 | 66 | |
| 17 | 263 | 42 | 342 | 67 | |
| 18 | 268 | 43 | 349 | 68 | |
| 19 | 274 | 44 | 292 | 69 | |
| 20 | 253 | 45 | 313 | 70 | |
| 21 | 285 | 46 | 358 | 71 | |
| 22 | 269 | 47 | 364 | 72 | |
| 23 | 296 | 48 | 326 | 73 | |
| 24 | 282 | 49 | 281 FAIL | 74 | |
| 25 | 316 | 50 | 318 | 75 | |

MEAN 304
MEDIAN 328
MINIMUM 253
MAXIMUM 403
STANDARD DEVIATION 38
NUMBER OF SAMPLES 58
NUMBER OF FAILURES 2
NUMBER OF MULTIPLES 0

SUMMARY EXAMPLE 1

| | |
|---|---|
| BACKSHEET | 14 mil POLYESTER |
| BACKING | 2.0 mil BRIGHTENED ACETATE FILM |
| PRIMER | PH-167 APPLIED WITH A 120 PYRAMIDAL |
| MEDIUM RELEASE LAB | TERPOLYMER ODA/MA/AA 54/31/15 |
| PREMIUM RELEASE LAB | G.E. EPOXY SILICONE 9300 3% CATYLIST |

-continued

| | |
|---|---|
| CATALYST | G.E. 9310C 3% |
| ADHESIVE | ISO-OCTYLACRYLATE/ACRYLIC ACID 95/4.5 @ 4.0 GRAINS/4" × 6" (24 inches square) |

TABLE 2

TOTAL DRAG FORCE DATA

| SAMPLE # | FORCE (GRAMS) | SAMPLE # | FORCE (GRAMS) | SAMPLE # | FORCE (GRAMS) |
|---|---|---|---|---|---|
| 1 | 222 | 26 | 253 | 51 | 214 |
| 2 | 260 | 27 | 210 | 52 | 229 |
| 3 | 213 | 28 | 224 | 53 | 244 |
| 4 | 237 | 29 | 229 | 54 | 247 |
| 5 | 237 | 30 | 235 | 55 | 229 |
| 6 | 234 | 31 | 241 | 56 | 290 |
| 7 | 216 | 32 | 239 | 57 | 215 |
| 8 | 237 | 33 | 220 | 58 | 241 |
| 9 | 231 | 36 | 235 | 59 | 272 |
| 10 | 211 | 35 | 220 | 60 | |
| 11 | 240 | 36 | 235 | 61 | |
| 12 | 237 | 37 | 215 | 62 | |
| 13 | 215 | 38 | 221 | 63 | |
| 14 | 243 | 39 | 220 | 64 | |
| 15 | 227 | 40 | 247 | 65 | |
| 16 | 240 | 41 | 249 | 66 | |
| 17 | 237 | 42 | 230 | 67 | |
| 18 | 245 | 43 | 233 | 68 | |
| 19 | 243 | 44 | 230 | 69 | |
| 20 | 246 | 45 | 235 | 70 | |
| 21 | 239 | 46 | 237 | 71 | |
| 22 | 260 | 47 | 209 | 72 | |
| 23 | 239 | 48 | 253 | 73 | |
| 24 | 282 | 49 | 237 | 74 | |
| 25 | 218 | 50 | 246 | 75 | |

MEAN 235
MEDIAN 250
MINIMUM 209
MAXIMUM 290
STANDARD DEVIATION 15
NUMBER OF SAMPLES 60
NUMBER OF FAILURES 0
NUMBER OF MULTIPLES 0

SUMMARY EXAMPLE 2

| | |
|---|---|
| BACKSHEET | 14 mil POLYESTER |
| BACKING | 2.0 mil BRIGHTENED ACETATE FILM |
| PRIMER | PH-167 APPLIED WITH A 120 PYRAMIDAL |
| MEDIUM RELEASE LAB | TERPOLYMER MC-886 ODA/MA/AA 50/45/5 |
| PREMIUM RELEASE LAB | G.E. EPOXY SILICONE 9300 3% CATYLIST |
| CATALYST | G.E. 9310C 3% |
| ADHESIVE | ISO-OCTYLACRYLATE/ACRYLIC ACID 95/4.5 @ 4.0 GRAINS/4" × 6" (24 inches square) |

TABLE 3

TOTAL DRAG FORCE DATA

| SAMPLE # | FORCE (GRAMS) | SAMPLE # | FORCE (GRAMS) | SAMPLE # | FORCE (GRAMS) |
|---|---|---|---|---|---|
| 1 | 271 | 26 | 303 | 51 | 287 |
| 2 | 277 | 27 | 293 | 52 | 236 |
| 3 | 259 | 28 | 250 | 53 | 327 |
| 4 | 309 | 29 | 268 | 54 | 199 |
| 5 | 303 | 30 | 258 | 55 | 331 |
| 6 | 270 | 31 | 283 | 56 | 227 |
| 7 | 276 | 32 | 292 | 57 | 309 |
| 8 | 281 | 33 | 284 | 58 | |
| 9 | 282 | 36 | 267 | 59 | |
| 10 | 302 | 35 | 260 | 60 | |

TABLE 3-continued

| TOTAL DRAG FORCE DATA | | | | | |
|---|---|---|---|---|---|
| SAMPLE # | FORCE (GRAMS) | SAMPLE # | FORCE (GRAMS) | SAMPLE # | FORCE (GRAMS) |
| 11 | 287 | 36 | 267 | 61 | |
| 12 | 264 | 37 | 359 | 62 | |
| 13 | 303 | 38 | 265 | 63 | |
| 14 | 299 | 39 | 286 | 64 | |
| 15 | 305 | 40 | 283 | 65 | |
| 16 | 269 | 41 | 283 | 66 | |
| 17 | 301 | 42 | 243 | 67 | |
| 18 | 258 | 43 | 327 | 68 | |
| 19 | 286 | 44 | 279 | 69 | |
| 20 | 297 | 45 | 249 | 70 | |
| 21 | 288 | 46 | 271 | 71 | |
| 22 | 312 | 47 | 313 | 72 | |
| 23 | 288 | 48 | 241 | 73 | |
| 24 | 307 | 49 | 254 | 74 | |
| 25 | 309 | 50 | 284 | 75 | |

MEAN 282
MEDIAN 279
MINIMUM 199
MAXIMUM 359
STANDARD DEVIATION 27
NUMBER OF SAMPLES 57
NUMBER OF FAILURES 0
NUMBER OF MULTIPLES 0

SUMMARY EXAMPLE 3

| | |
|---|---|
| BACKSHEET | 14 mil POLYESTER |
| BACKING | 2.0 mil BRIGHTENED ACETATE FILM |
| PRIMER | PH-167 APPLIED WITH A 120 PYRAMIDAL |
| MEDIUM RELEASE LAB | R1-8705 ODA/AA/MA 57/12/31 APPLIED WITH 200 RULING MIL |
| PREMIUM RELEASE LAB | G.E. EPOXY 9300 SILICONE |
| CATALYST | G.E. 9310C 3% |
| ADHESIVE | ISO-OCTYLACRYLATE/ACRYLIC ACID 95/4.5 @ 4.0 GRAINS/4" × 6" (24 inches square) |

TABLE 4

| TOTAL DRAG FORCE DATA | | | | | |
|---|---|---|---|---|---|
| SAMPLE # | FORCE (GRAMS) | SAMPLE # | FORCE (GRAMS) | SAMPLE # | FORCE (GRAMS) |
| 1 | 215 | 26 | 281 | 51 | 285 |
| 2 | 245 | 27 | 250 | 52 | 288 |
| 3 | 251 | 28 | 277 | 53 | 246 |
| 4 | 281 | 29 | 257 | 54 | 291 |
| 5 | 257 | 30 | 262 | 55 | 257 |
| 6 | 256 | 31 | 237 | 56 | 313 |
| 7 | 238 | 32 | 286 | 57 | 251 |
| 8 | 261 | 33 | 233 | 58 | 302 |
| 9 | 228 | 36 | 296 | 59 | |
| 10 | 271 | 35 | 240 | 60 | |
| 11 | 250 | 36 | 296 | 61 | |
| 12 | 270 | 37 | 214 | 62 | |
| 13 | 239 | 38 | 289 | 63 | |
| 14 | 273 | 39 | 240 | 64 | |
| 15 | 245 | 40 | 269 | 65 | |
| 16 | 270 | 41 | 277 | 66 | |
| 17 | 260 | 42 | 299 | 67 | |
| 18 | 243 | 43 | 266 | 68 | |
| 19 | 255 | 44 | 276 | 69 | |
| 20 | 272 | 45 | 242 | 70 | |
| 21 | 249 | 46 | 291 | 71 | |
| 22 | 274 | 47 | 240 | 72 | |
| 23 | 244 | 48 | 318 | 73 | |

TABLE 4-continued

TOTAL DRAG FORCE DATA

| SAMPLE # | FORCE (GRAMS) | SAMPLE # | FORCE (GRAMS) | SAMPLE # | FORCE (GRAMS) |
|---|---|---|---|---|---|
| 24 | 279 | 49 | 259 | 74 | |
| 25 | 215 | 50 | 299 | 75 | |

MEAN 263
MEDIAN 266
MINIMUM 214
MAXIMUM 318
STANDARD DEVIATION 24
NUMBER OF SAMPLES 58
NUMBER OF FAILURES 0
NUMBER OF MULTIPLES 0

SUMMARY EXAMPLE 4

| | |
|---|---|
| BACKSHEET | 14 mil POLYESTER |
| BACKING | 2.0 mil UNBRIGHTENED ACETATE FILM |
| PRIMER | PH-167 APPLIED WITH A 120 PYRAMIDAL |
| MEDIUM RELEASE LAB | TERPOLYMER ODA/MA/AA 54/34/12 |
| PREMIUM RELEASE LAB | G.E. 9300 EPOXY SILICONE 9300 3% CATYLIST |
| CATALYST | G.E. 9310C 3% |
| ADHESIVE | ISO-OCTYLACRYLATE/ACRYLIC ACID 95/4.5 @ 4.0 GRAINS/4" × 6" (24 inches square) |

Release force measurements of differential release system: This test method measured the release force required to separate the pressure sensitive adhesive coating on one sheet from the medium release low adhesion backsize and the premium release coated surfaces of the underlying sheet. A 3 inch wide stock roll was used for each example 1–4. A sample of each stock roll is adhered to a platform on a constant rate extension device, next a 1 inch×3 inch sample of one of the stock rolls is adhered to the medium release low adhesion backsize (LAB) and peeled off the top sheet at 180 degrees by moving the platform at a speed of 229 cm/min in a direction parallel to the surfaces of the two attached sheets. The average force required to remove the sample from the medium release LAB and premium release LAB is reported as the release force value of the sheet to the LAB. For examples 1–4 the results are shown in Table-5.

TABLE 5

| Example | Release force MEDIUM LAB grams/inch | Release force MEDIUM LAB grams/centimeter | Release force PREMIUM LAB grams/inch | Release force PREMIUM LAB grams/centimeter |
|---|---|---|---|---|
| 1 | 128 | 50.4 | 4 | 1.6 |
| 2 | 150 | 59 | 6 | 2.4 |
| 3 | 100 | 39.4 | 4 | 2.4 |
| 4 | 140 | 55 | 4 | 2.4 |

The present invention has now been described with reference to several embodiments thereof. It will be apparent to those skilled in the art that many changes or additions can be made in the embodiments described without departing from the scope of the present invention. For example, a release liner may be utilized to produce a differential release pad. Also, pattern coated low adhesion backsizes and adhesives may be used to produce the desired results. Known corona treatment of silicones may also be used to produce the desired release characteristics in the pad. Thus, the scope of the present invention should not be limited to the structures described in this application, but only by structures described by the language of the claims and the equivalents of those structures.

What is claimed is:

1. A stack of successive sheets disposed one on top of another, said stack ultimately including at least a first, uppermost sheet, a second sheet beneath and adjacent the uppermost sheet and a third sheet beneath and adjacent the second sheet, each of said sheets comprising:

a backing having first and second opposite major side surfaces and first and second opposite ends with the first end of each sheet in alignment with the second end of an adjacent sheet in said stack, and an adhesive generally permanently adhered adjacent to the first major side surface of said sheet backing with at least some adhesive generally adjacent the first and second ends of each of said sheets, the adhesive of each sheet releasably adhering said sheet along the second major side surface of the adjacent sheet in said stack; at least two of said sheets each comprising:

a premium release low adhesion backsize (LAB) adjacent said second major side surface and generally adjacent said first end of a sheet for providing a first adhesion level between the adhesive of an adjacent upper sheet in the stack and the sheet with the premium release low adhesion backsize (LAB), a medium release low adhesion backsize (LAB) adjacent said second major side surface and generally adjacent said second end of the sheet for providing a second adhesion level between the adhesive of an adjacent upper sheet in the stack and the sheet with the medium release low adhesion backsize (LAB);

said first adhesion level providing a sufficiently low release force between the adhesive of the second sheet and the second major side surface of the third sheet to afford sliding movement between portions of the first and second sheets relative to the third sheet, said second adhesion level providing a release force that is greater than said low release force to firmly adhere a portion of the first sheet to the second sheet during the sliding movement of the portions of the first and second sheets relative to the third sheet, and wherein said second adhesion level affords peeling away of said first sheet from said second sheet.

2. A stack of successive sheets disposed one on top of another, said stack ultimately including at least a first, uppermost sheet, a second sheet beneath and adjacent the uppermost sheet and a third sheet beneath and adjacent the second sheet, each of said sheets comprising:

a backing having first and second opposite major side surfaces and first and second opposite ends with the first end of each sheet in alignment with the second end of an adjacent sheet in said stack, and an adhesive generally permanently adhered adjacent to the first major side surface of said sheet backing with at least some adhesive generally adjacent the first and second ends of each of said sheets, the adhesive of each sheet releasably adhering said sheet along the second major side surface of the adjacent sheet in said stack; at least two of said sheets each comprising:

a first coating of pressure sensitive adhesive adjacent said first major side surface and generally adjacent said first end of a sheet for providing a first adhesion level between the second major side surface of an adjacent lower sheet in the stack and the sheet with the first coating of pressure sensitive adhesive, a second coating of pressure sensitive adhesive adjacent said first major side surface generally adjacent said second end of the sheet for providing a second adhesion level between the second major side surface of an adjacent lower sheet in the stack and the sheet with the second coating of pressure sensitive adhesive;

said first adhesion level providing a sufficiently low release force between the adhesive of the second sheet and the second major side surface of the third sheet to afford sliding movement between portions of the first and second sheets relative to the third sheet, said second adhesion level providing a release force that is greater than said low release force to firmly adhere a portion of the first sheet to the second sheet during the sliding movement of the portions of the first and second sheets relative to the third sheet, and wherein said second adhesion level affords peeling away of said first sheet from said second sheet.

3. A stack of sheets according to claim 2 wherein said first coating of pressure sensitive adhesive comprises a different adhesive composition than said second coating of pressure sensitive adhesive.

4. A stack of sheets according to claim 3 wherein said first coating of pressure sensitive adhesive comprises a discontinuous coating of pressure sensitive adhesive and said second coating of pressure sensitive adhesive comprises a continuous coating of pressure sensitive adhesive.

* * * * *